US010369402B2

(12) United States Patent
Sotis et al.

(10) Patent No.: US 10,369,402 B2
(45) Date of Patent: Aug. 6, 2019

(54) MODULAR AGILITY LADDER

(71) Applicant: Prism Fitness, Inc., Verona, WI (US)

(72) Inventors: William J. Sotis, Fitchburg, WI (US); Weng Kin Chen, Shanghai (CN)

(73) Assignee: Prism FItness, Inc., Verona, WI (US)

( * ) Notice: Subject to any disclaimer, the term of this patent is extended or adjusted under 35 U.S.C. 154(b) by 152 days.

(21) Appl. No.: 15/693,845

(22) Filed: Sep. 1, 2017

(65) Prior Publication Data
US 2018/0056115 A1 Mar. 1, 2018

Related U.S. Application Data

(60) Provisional application No. 62/382,309, filed on Sep. 1, 2016.

(51) Int. Cl.
| | | |
|---|---|---|
| *A63B 22/00* | (2006.01) | |
| *G09B 19/00* | (2006.01) | |
| *A63B 71/00* | (2006.01) | |
| *A63B 21/00* | (2006.01) | |

(Continued)

(52) U.S. Cl.
CPC ........ *A63B 22/00* (2013.01); *A63B 21/00047* (2013.01); *A63B 23/0405* (2013.01); *A63B 69/00* (2013.01); *A63B 71/0036* (2013.01); *G09B 19/0038* (2013.01); *A63B 2022/0092* (2013.01); *A63B 2209/00* (2013.01); *A63B 2209/10* (2013.01); *A63B 2210/50* (2013.01); *A63B 2225/09* (2013.01)

(58) Field of Classification Search
CPC ............ G09B 19/0038; A63B 71/0036; A63B 2209/10; A63B 2225/09; A63B 2209/00; A63B 2210/50
See application file for complete search history.

(56) References Cited

U.S. PATENT DOCUMENTS

| | | | | |
|---|---|---|---|---|
| 2,370,728 | A * | 3/1945 | Hopp .................... | E06C 1/56 182/197 |
| 3,563,539 | A * | 2/1971 | Rogers .................. | A63B 7/02 248/327 |

(Continued)

OTHER PUBLICATIONS

"15 Inch Dual Agility Ladder", http://www.sportsinvasion.com/15-Dual-Agility-Ladder-DAL-15.htm, downloaded Aug. 12, 2016.

(Continued)

*Primary Examiner* — Garrett K Atkinson
(74) *Attorney, Agent, or Firm* — Stiennon & Stiennon

(57) ABSTRACT

An agility ladder exercise device has plural rungs which are connected by spaced flexible straps. Each rung has a left connector and a right connector, the left connector having structure thereon which engages with a right connector of a similar rung in a non-pivoting connection. The one or more ladders may be laid out on a play surface for use in agility exercises where the rungs of each ladder are spaced parallel to one another. Multiple ladders may be connected side to side, and can change lanes, or form a zig zag path. The ladders are stored with the rungs stacked parallel to one another within a holder with a U-shaped base. Each holder has connectors allowing a pair of holders to be releasably connected, and has a necked down region defined by restraint walls that engage with notches in the rungs.

19 Claims, 8 Drawing Sheets

(51) Int. Cl.
*A63B 23/04* (2006.01)
*A63B 69/00* (2006.01)

(56) References Cited

U.S. PATENT DOCUMENTS

| | | | | |
|---|---|---|---|---|
| 4,176,471 A * | 12/1979 | Roe | ............... | A61H 3/00 |
| | | | | 434/255 |
| 4,298,092 A * | 11/1981 | Eriksson | ............... | E06C 9/14 |
| | | | | 182/196 |
| 4,475,628 A * | 10/1984 | Heilskov | ............... | B63B 27/14 |
| | | | | 182/198 |
| 4,478,549 A * | 10/1984 | Stelly | ............... | B65G 69/30 |
| | | | | 182/104 |
| 4,630,819 A * | 12/1986 | Levin | ............... | A63B 9/00 |
| | | | | 182/118 |
| 5,066,001 A * | 11/1991 | Wilkinson | ............... | A63B 6/00 |
| | | | | 482/52 |
| 5,605,205 A * | 2/1997 | Douglas | ............... | E06C 1/56 |
| | | | | 182/198 |
| 5,746,287 A * | 5/1998 | Durham, Jr. | ............... | A62B 5/00 |
| | | | | 182/196 |
| 5,971,105 A * | 10/1999 | Jacobson | ............... | E06C 1/525 |
| | | | | 182/196 |
| 6,447,427 B1 * | 9/2002 | Myrland | ............... | A63B 23/0464 |
| | | | | 482/14 |
| 6,475,116 B2 * | 11/2002 | Chen Wu | ............... | A63K 3/043 |
| | | | | 482/14 |
| 6,475,117 B1 * | 11/2002 | Berglund | ............... | A63B 9/00 |
| | | | | 403/171 |
| 6,945,360 B2 * | 9/2005 | Sullivan, Jr. | ............... | E04G 1/28 |
| | | | | 182/151 |
| 6,955,631 B2 * | 10/2005 | Chen Wu | ............... | A63B 23/0464 |
| | | | | 182/196 |
| 7,645,211 B1 * | 1/2010 | Thomeczek | ............... | A63B 69/0053 |
| | | | | 482/1 |
| 7,841,957 B1 * | 11/2010 | Wares | ............... | A63B 69/0071 |
| | | | | 473/433 |
| 7,874,959 B2 * | 1/2011 | Dieter | ............... | A63B 23/0464 |
| | | | | 473/414 |
| 8,070,656 B2 * | 12/2011 | Dieter | ............... | A63B 23/0464 |
| | | | | 473/414 |
| 8,317,661 B2 * | 11/2012 | Wight | ............... | A63B 23/0464 |
| | | | | 482/37 |
| 8,328,696 B2 * | 12/2012 | Dieter | ............... | A63B 23/0464 |
| | | | | 473/414 |
| 8,574,133 B2 * | 11/2013 | Dieter | ............... | A63B 23/0464 |
| | | | | 473/414 |
| D722,469 S * | 2/2015 | Bodum | ............... | D7/387 |
| 9,186,543 B2 * | 11/2015 | Loane | ............... | A63B 22/203 |
| 9,333,383 B1 * | 5/2016 | Barton | ............... | A63B 21/00047 |
| 9,675,830 B2 * | 6/2017 | Holland | ............... | A63B 69/00 |
| 2006/0247100 A1 * | 11/2006 | Harker | ............... | A63B 5/16 |
| | | | | 482/23 |
| 2010/0203780 A1 * | 8/2010 | Hobbs | ............... | A61G 1/013 |
| | | | | 441/80 |
| 2010/0285906 A1 * | 11/2010 | Wares | ............... | A63B 69/0071 |
| | | | | 473/433 |
| 2015/0060204 A1 * | 3/2015 | Walter | ............... | E06C 1/383 |
| | | | | 182/163 |
| 2015/0099609 A1 * | 4/2015 | White | ............... | A63B 17/00 |
| | | | | 482/23 |
| 2015/0224379 A1 * | 8/2015 | Holland | ............... | A63B 69/00 |
| | | | | 482/51 |
| 2017/0246523 A1 * | 8/2017 | Holland | ............... | A63B 69/00 |
| 2017/0291070 A1 * | 10/2017 | Chen | ............... | A63B 26/003 |

OTHER PUBLICATIONS

"Smart Agility Ladder TM," Prism Fitness Group, Middleton, WI (2011).

* cited by examiner

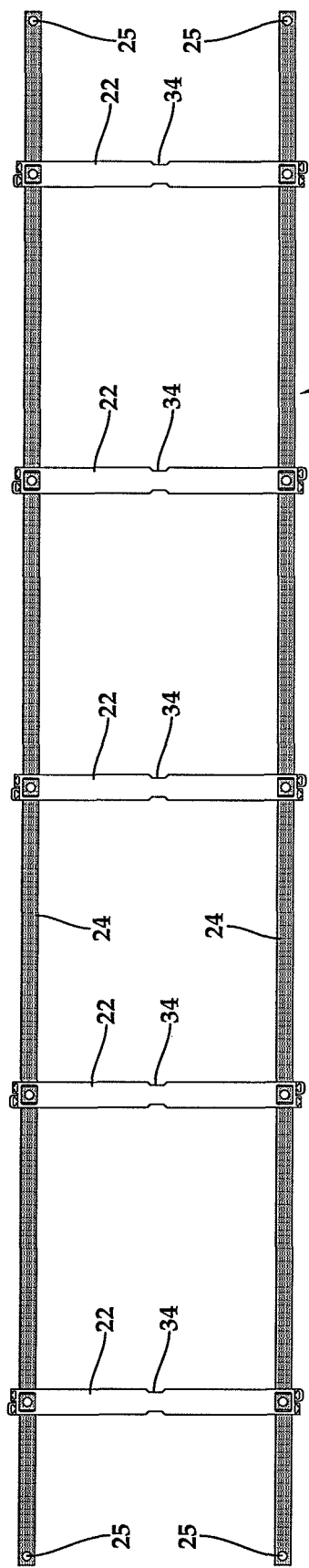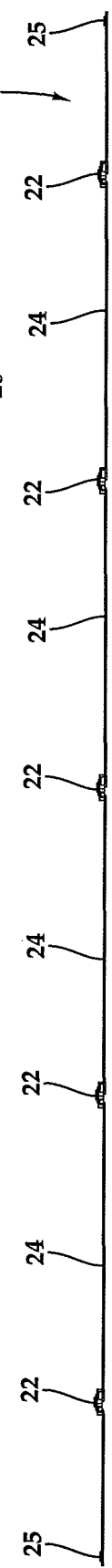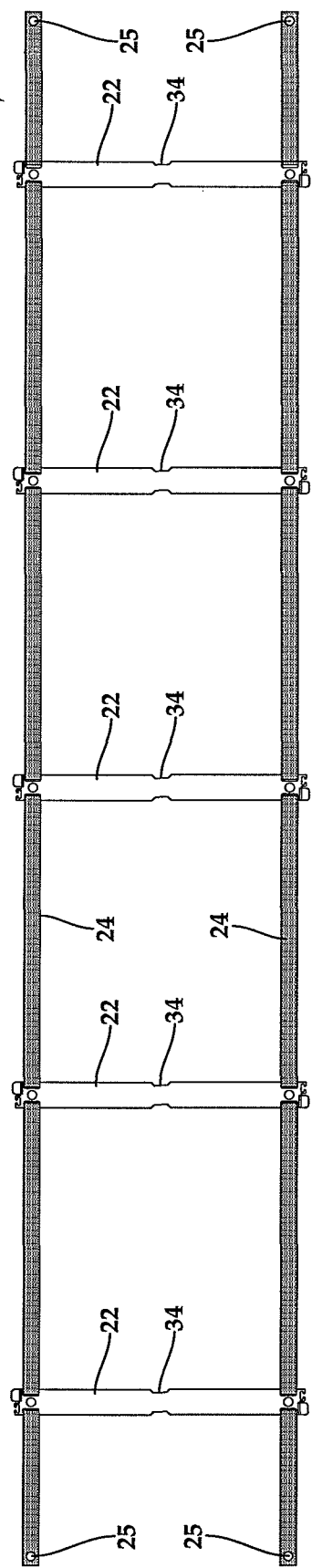

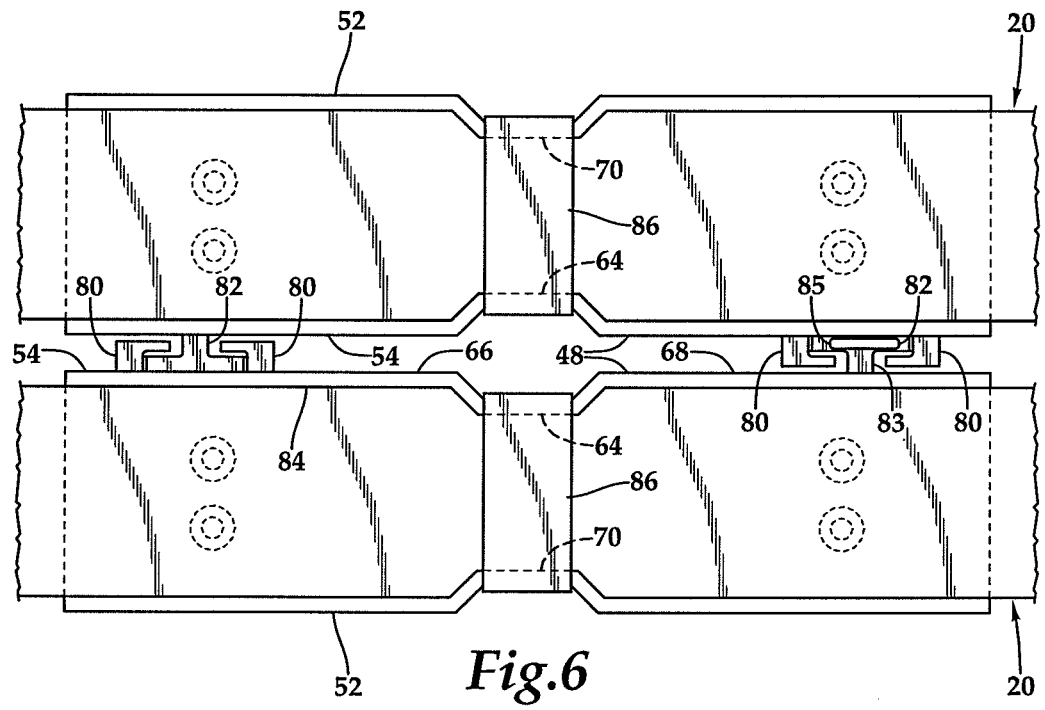
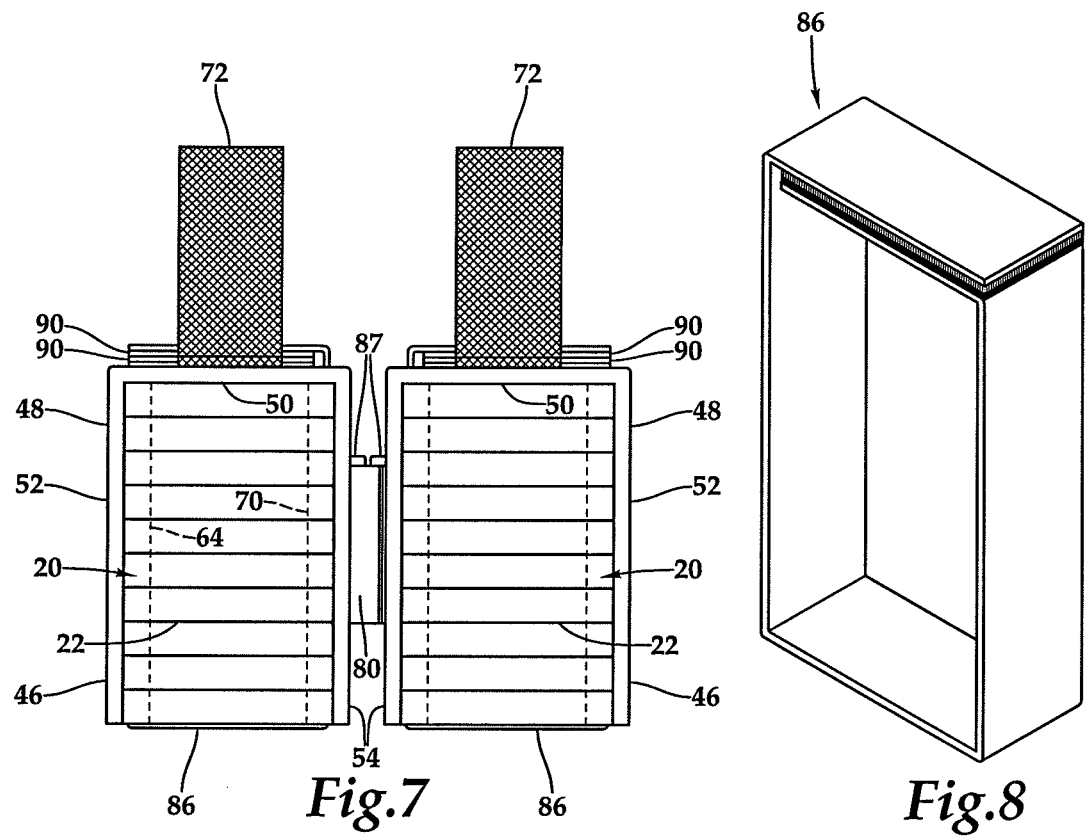

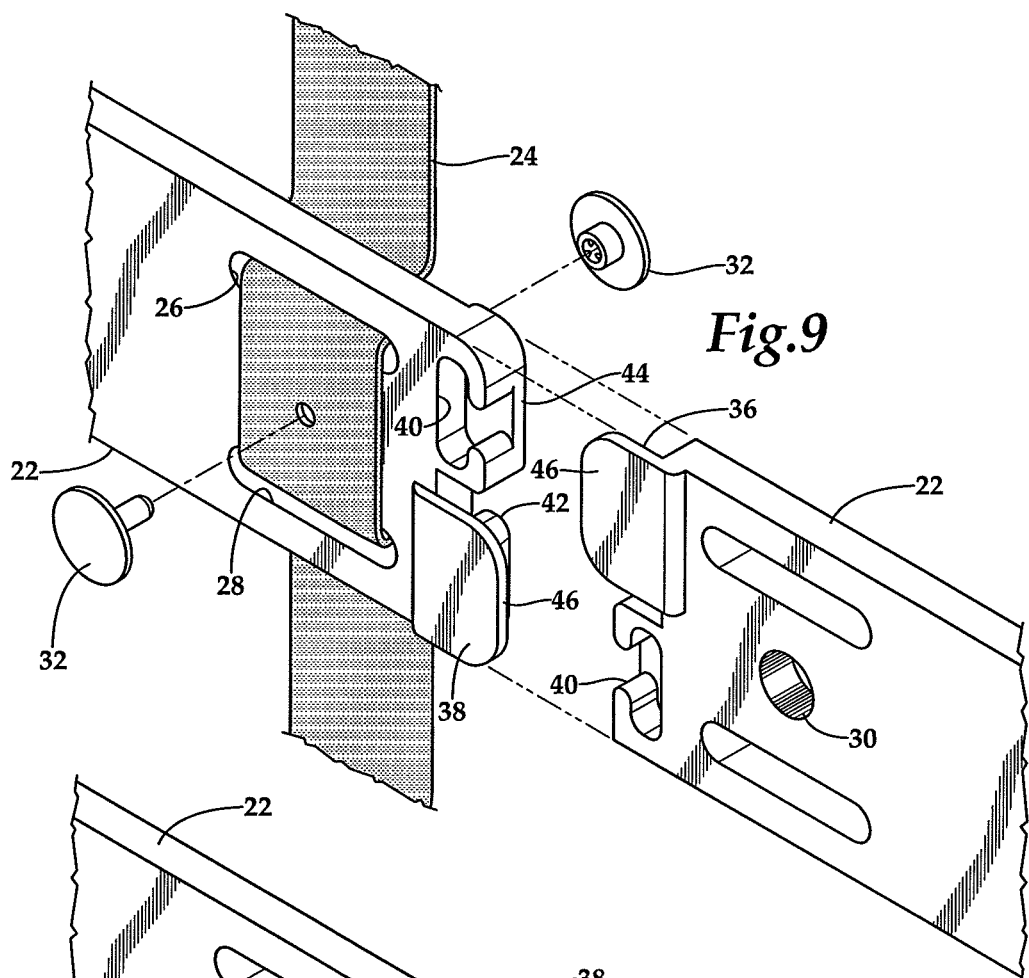
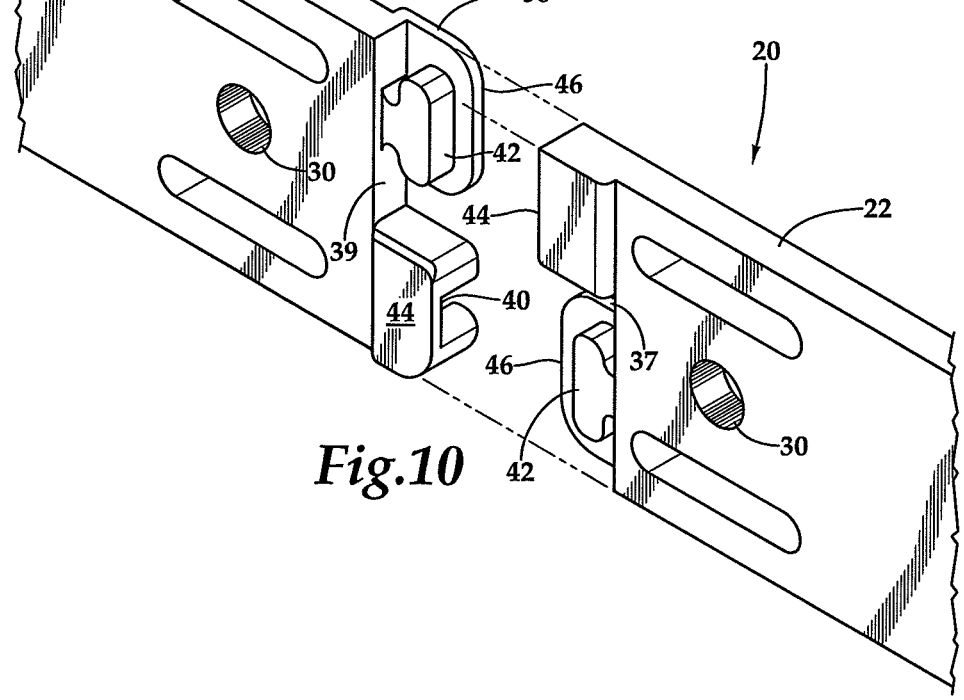

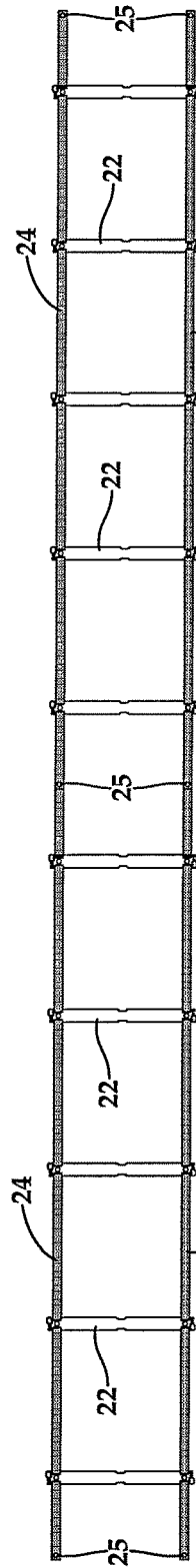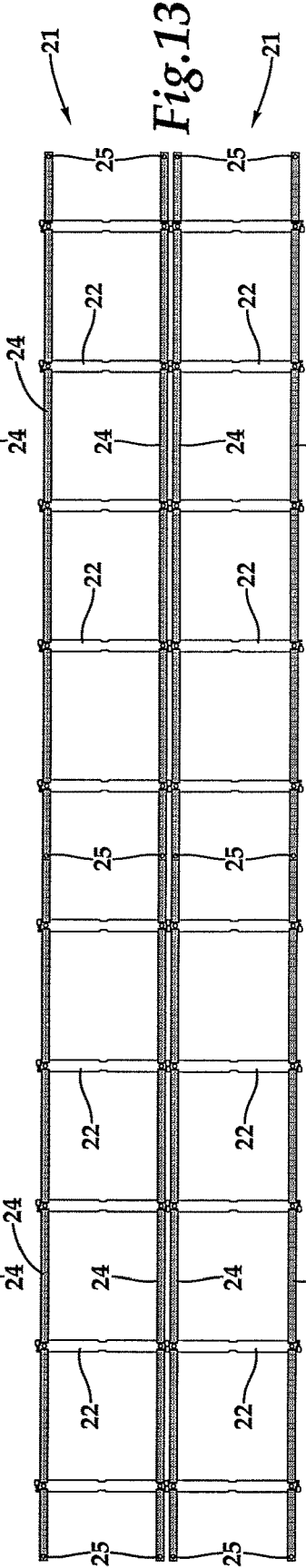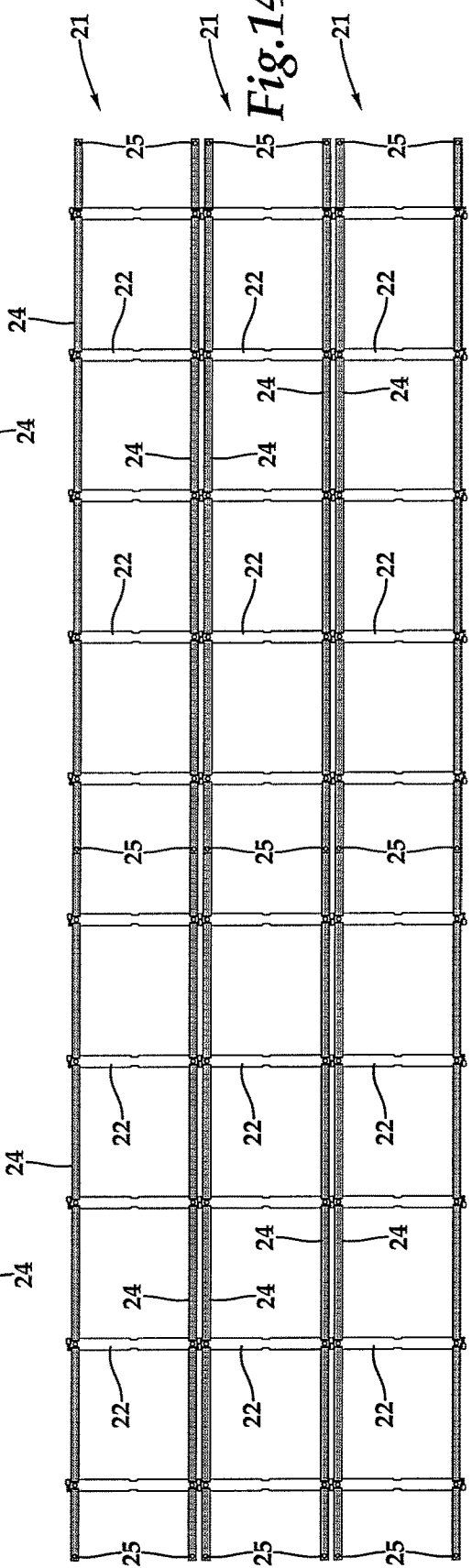

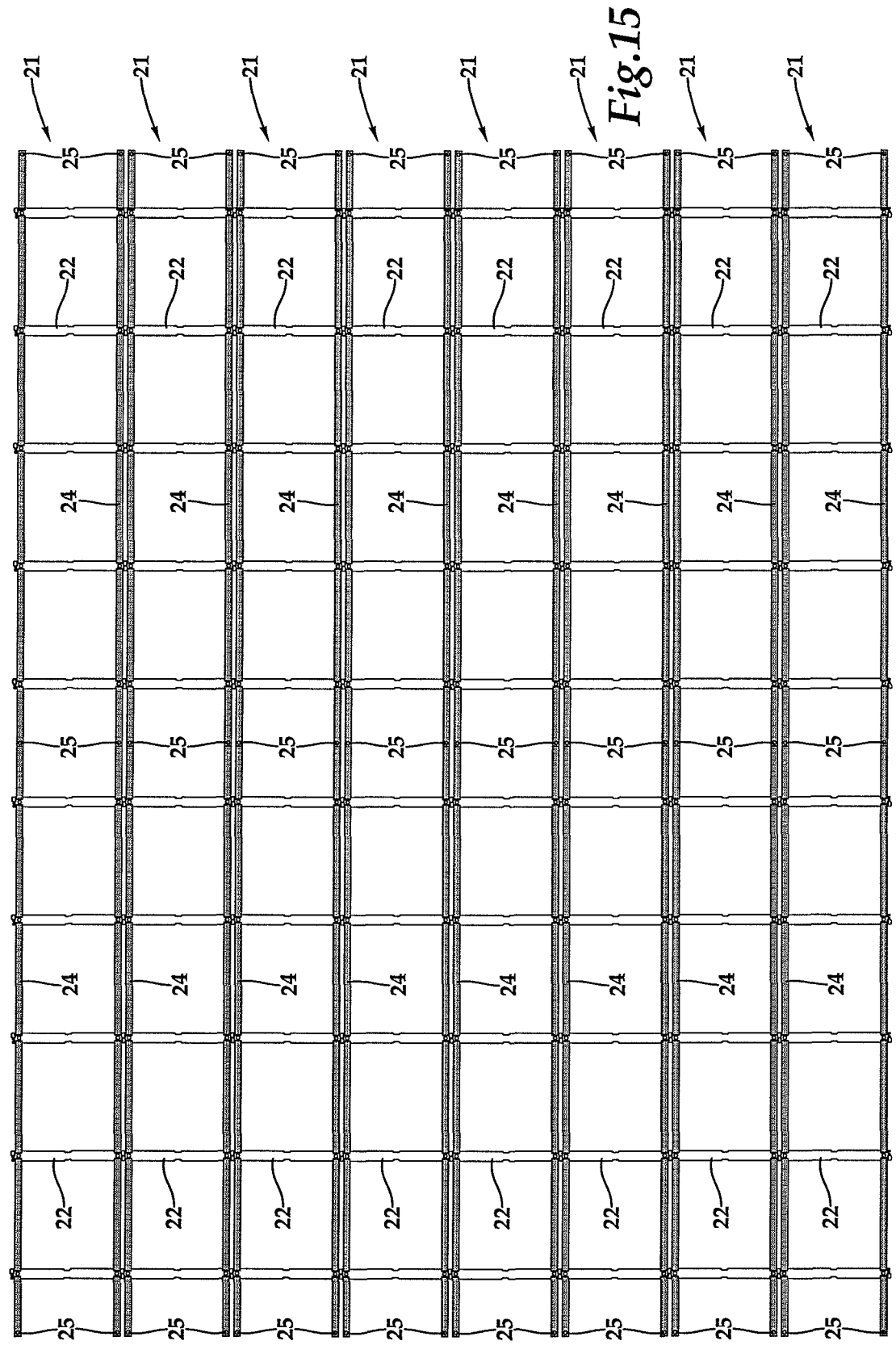

US 10,369,402 B2

MODULAR AGILITY LADDER

CROSS REFERENCES TO RELATED APPLICATIONS

This application claims priority on U.S. Provisional Application No. 62/382,309 which was filed on Sep. 1, 2016, the disclosure of which is incorporated herein by reference.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to athletic training devices in general, and to agility training apparatuses in particular.

Many athletic activities require not only strength, but the ability to precisely control the athlete's movements, to have a sense of body positioning, and to rapidly change direction. Training for sports like football includes exercises in which the athlete practices moving with speed and precision through a predetermined course. The target course can be marked out with physical apparatuses. For example, a series of automotive tires can be laid out in a course, and an athlete can move through the course placing each footfall in a different tire. Yet tires are bulky and cumbersome, and burdensome to move, store, and place. The agility ladder is a lightweight and compact apparatus to facilitate this training, usually comprised of parallel transverse rungs, fabricated of a stiff material such as a plastic strip or tubing, and joined by parallel runners which connect the rungs, and which may be flexible strips of woven webbing, stiff tubing, or linkages. These agility ladder segments may be readily stored and transported, and can be laid out in sequence to provide a variety of training exercises. Various mechanisms for storing and transporting individual ladder segments are known. For example, metal handles can be extended through slots in individual rungs, or the entire assembly may be collected and stored in a nylon or netting drawstring bag.

What is needed is an agility ladder arrangement that can be readily stored, transported, and assembled into various configurations.

SUMMARY OF THE INVENTION

An agility ladder exercise device has plural rungs which are connected by spaced flexible straps. Each rung has a left connector and a right connector, the left connector having structure thereon which engages with a right connector of a similar rung in a non-pivoting connection. The ladder may be laid out on a play surface for use in agility exercises, with the rungs spaced parallel to one another, and then collected with the rungs stacked parallel to one another within a holder with a U-shaped base. Each holder has connectors allowing a pair of holders to be releasably connected, and has a necked down region defined by restraint walls that engage with notches in the rungs.

It is an object of the present invention to provide agility ladder segments, the rungs of which are connectable end to end to allow the modular assembly of agility ladders with rungs of a desired width.

It is also an object of the present invention to provide a pair of like agility ladder holders which can be compactly and releasably connected to conveniently carry the components of a double width agility ladder.

It is another object of the present invention to provide an agility ladder which can be combined in groups of two or more to form an array of patterns including a grid, shifted lanes of rungs, and a zig zag pattern.

Further objects, features and advantages of the invention will be apparent from the following detailed description when taken in conjunction with the accompanying drawings.

BRIEF DESCRIPTION OF THE DRAWINGS

FIG. 3 is a top plan view of one of two segments of an agility ladder of the invention.

FIG. 4 is a side elevation view of the ladder segment of FIG. 3.

FIG. 5 is a bottom plan view of the ladder segment of FIG. 3.

FIG. 6 is a bottom plan view of the two joined agility ladder assemblies of FIG. 1 partly cut away.

FIG. 7 is an end elevational view of the joined agility ladder assemblies of FIG. 1.

FIG. 8 is a isometric view of a hook and loop flexible strap shown in FIGS. 1-2 and 6-7.

FIG. 9 is a fragmentary exploded isometric top view of the rungs of two adjacent agility ladders.

FIG. 10 is a fragmentary exploded isometric bottom view of the rungs of two adjacent agility ladders.

FIG. 12 is a plan view of two segments of the agility ladder of this invention connected into one agility ladder.

FIG. 13 is a plan view of 4 segments of two agility ladders of this invention connected into a double wide agility ladder.

FIG. 14 is a plan view of 6 segments of three agility ladders of this invention connected into a triple wide agility ladder.

FIG. 15 is a plan view of a multiplicity of segments of the agility ladder of this invention connected into a ladder grid.

DESCRIPTION OF THE PREFERRED EMBODIMENTS

Figure 1:
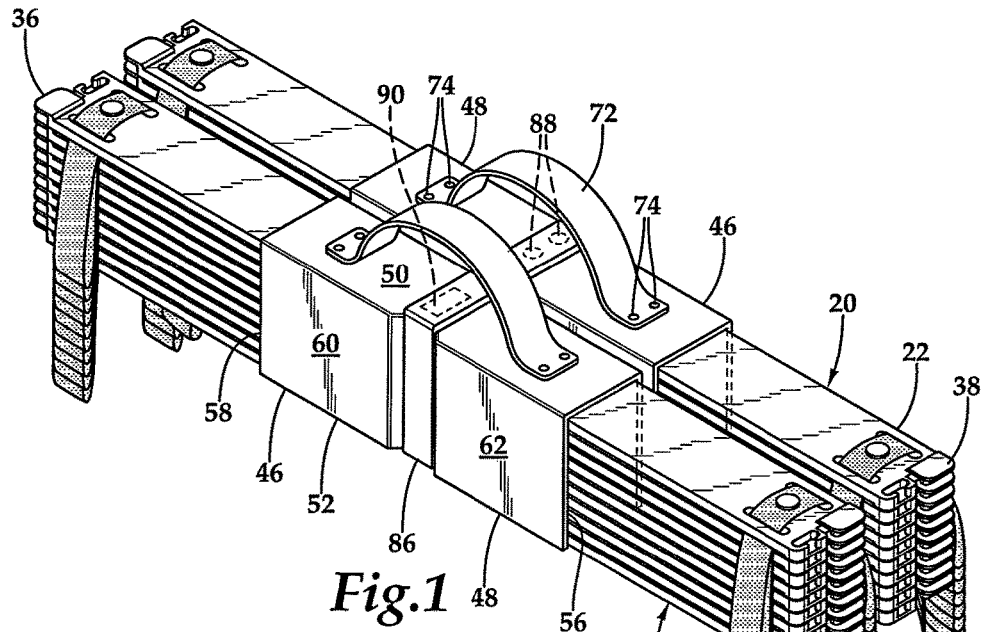
FIG. 1 is an isometric view of two agility ladder assemblies of this invention with their holders connected together.

Referring more particularly to FIGS. 1-17 wherein like numbers refer to similar parts, an agility ladder segment 20 is shown in FIG. 3. Each agility ladder segment 20 has a plurality of shaped plastic rungs 22, for example five, which are joined by two flexible straps 24, which may be formed of woven fabric one-inch wide webbing. The rungs 22 extend generally parallel to each other, and when disposed on a running surface are spaced on the straps about 15 to 18 inches apart. (For clarity, the straps have been omitted in FIGS. 6, 7, 10 and part of 9.) The 22 rungs may be about 18 inches long. Each rung 22 is fixed at each end to a strap 24 which extends through an inlet slot 26 and an outlet slot 28 as shown in FIG. 9. A fastener opening 30 is located on each rung end between the inlet slot 26 and the outlet slot 28. A two-part snap fastener 32 such as a plastic rivet passes through the strap 24 and extends through the fastener opening 30 to fix the strap to the rung 22.

The straps 24, as shown in FIG. 3, extend beyond the first and last rungs 22 of the ladder segment 20 and have one part 25 of a two-part snap fastener so that multiple ladder segments 20 may be connected together. Preferably the length of the terminal segments of the straps is one half the distance between the other rungs, so that a common rung spacing can be maintained so that as many ladder segments as are desired are connected together over whatever length is desired.

Each rung 22, as shown in FIGS. 3, 5-6 and 7, has two notches 34 positioned at the midpoint of the rung between the opposite ends. As shown in FIGS. 9-10, each rung 22 has a left connector 36 and a right connector 38 which allow similar rungs 22 to be joined end to end in a non-pivoting connection, which allows the joined rungs of two adjacent ladder segments to act as essentially a single rung for most purposes. The left connector 36 comprises a T-slot 40 which is spaced sidewardly from a T-key 42, each of the T-slot and T-key having an underlying platform 44, 46. The right connector 38 has similar structure to the left connector, only rotated 180 degrees, such that the T-key 42 and T-slot 40 of one rung can be engaged with and retained by the T-slot and T-key of the rung of a sidewardly adjoining ladder. To connect the rungs 22 with the connectors 36, 38 two rungs are brought together so the gaps 39 and 37 overlap with the rung ends approximately perpendicular to each other and rotated into a common plane to connect the T-slots and T-keys of each pair of rungs. This results in a connection which is not broken by flexing or pulling on the joined rungs, so only a counter rotation will separate the joined rungs. Such a rotation is not likely to occur during ordinary use. Any slot and key arrangement that can be closed by rotation, and once closed, locks the rungs together against lateral and horizontal movement could be used.

As shown in FIGS. 1-2 and 6-7, two agility ladder segments 20 may be received within a holder 46 and two like holders may be releasably connected together. The holder 46 as shown in FIG. 6 is a molded plastic element having an inverted U-channel base 48 with a top wall 50 which connects a front wall 52 to a rear wall 54. The front wall 52 and the rear wall 54 extend from an open left end 56 to an open right end 58 of the U-channel base 48. The front 52 wall has a first segment 60 which is spaced sidewardly from and aligned parallel with a second segment 62. A front restraint wall 64 is spaced from the first front wall segment and the second front wall segment towards the rear wall 54. Similarly, the rear wall 54 has a first segment 66 and an aligned spaced second segment 68, with a rear restraint wall 70 spaced from the first and second rear wall segments towards the front wall. The front and rear restraint walls thus extend into the notches 34 of the stacked rungs 22 received within the U-channel base 48. The rungs with their engaged notches are thereby restrained from escaping from the U-channel base in the direction of the left and right ends.

Figure 2:
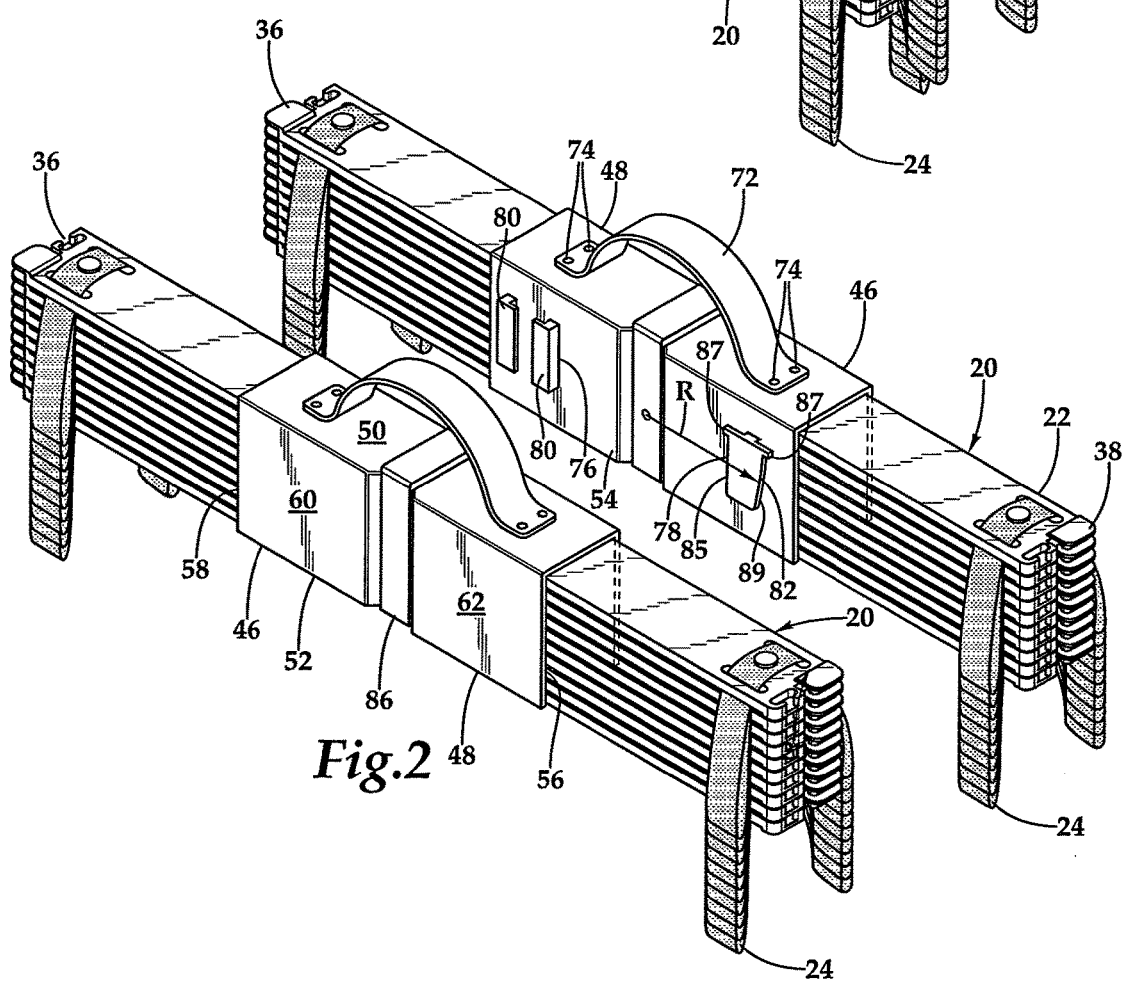
FIG. 2 is an exploded isometric view of the two agility ladder assemblies of FIG. 1, shown spaced apart.
Figure 11:
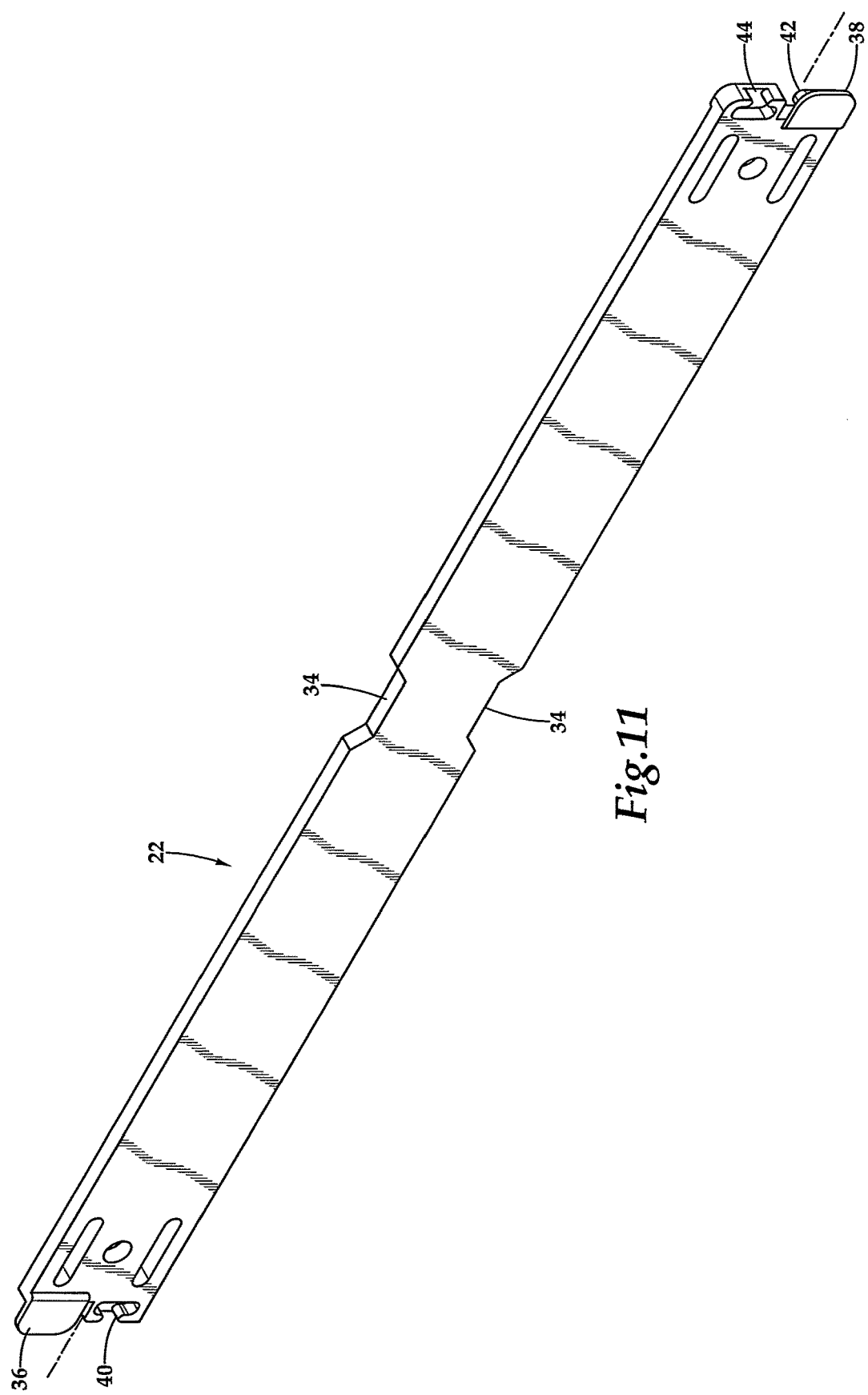
FIG. 11 is an isometric view of a single rung of the agility ladder of FIGS. 3-5.

Each holder 46 may thus retain in a compact and portable fashion two agility ladder segments. Each holder 46 is preferably constructed to be releasably connectable to a like holder. In this way, four agility ladder segments 20 i.e., two agility ladders 21 can be carried as a combined compact assembly. As shown in FIG. 2, one of the front wall or the rear wall, for example the rear wall 54 as illustrated, is provided with a first mechanical connector 76 and a second mechanical connector 78 which extend from one of the first rear wall segments and the second rear wall segment. The connectors 76 and 78 are configured such that the holder is mechanically connectable to a like holder which is rotated 180 degrees about an axis extending parallel to the front and rear walls 52, 54. For example, the first mechanical connector 76 may be two L-shaped members 80 which project from the rear wall. The second mechanical connector 78 may be a single T-shaped projecting member 82 which is dimensioned to be received in a friction fit between the two L-shaped members 80.

The T-shaped projecting member 82 has a stem 83, shown in FIG. 6, which projects a cap 85 away from the rear wall 54. As shown in FIG. 2, the cap 85 is terminated by two flanges 87 positioned towards the top wall of the U-channel. One outer edge 89 of the cap is curved so that the width of the cap 85 becomes narrower as it extends away from the flanges 87. Thus two holders 46 are connected by engaging the caps 85 within the opposed pairs of L-shaped members 80, and rotating the holders to drive the caps into the spaces between the L-shaped members. Each cap 85 has one outer edge 89 which is curved with a radius R which extends from the middle of the notch 34 to the outer edge so that the mechanical connectors 76, 78 can be rotated into engagement. The flanges 87 on the caps serve to halt the rotation when the holders 46 are in a final position of engagement as shown in FIG. 6.

It should be noted that the holder is configured to work with a like holder containing a similar agility ladder, but the mechanical connectors would also allow the holder 46 to be joined to some other holder for a different type of exercise accessory.

A first flexible strap handle 72 is fastened to the top wall 50 of the holder U-channel base 48 by multiple fasteners 74 as shown in FIGS. 1 and 2. A second flexible strap handle, not shown, may be connected to the front or rear wall of the U-channel base, opposite the first mechanical connector and the second mechanical connector.

To restrain the contained agility ladder segments 20 from escaping out the bottom opening 84 between the front wall 52 and the rear wall of the U-channel base, a flexible strap 86 which is fastened to the bottom wall by fasteners 88 is wrapped across the opening 84 and connected to itself, for example by hook and loop fasteners 90 on the ends of the strap.

Thus a user who desires to use only a single agility ladder 21 assembled from two segments 20, as shown in FIG. 12 may take only a single holder with its contents to prepare for agility exercises. Where a wider ladder arrangement is called for, the user may take two holders as shown in FIG. 13 and their contents and connect the holders together for transport to the exercise site. At the site, the two like ladder segments are deployed, and the end connectors of the ladders' rungs are connected together. Similarity three agility ladders 21 can be joined as shown in FIG. 14. Further agility ladders 21 can be joined until a grid of multiple agility ladders 21 is formed as shown in FIG. 15.

Figure 16:
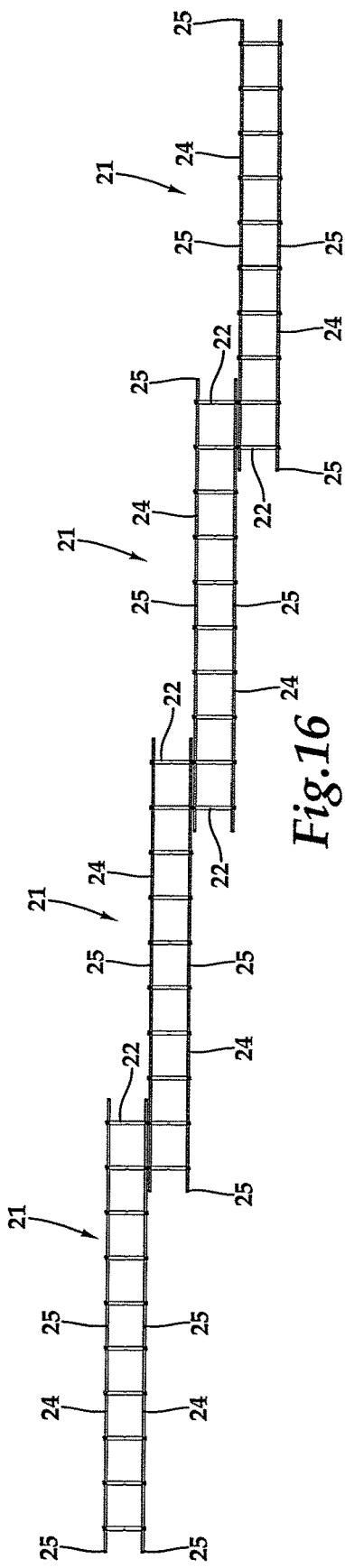
FIG. 16 is a plan view of a multiplicity of segments of the agility ladder of this invention connected into a ladder where placement of the ladder shifts the line of the ladder into a parallel lane.
Figure 17:
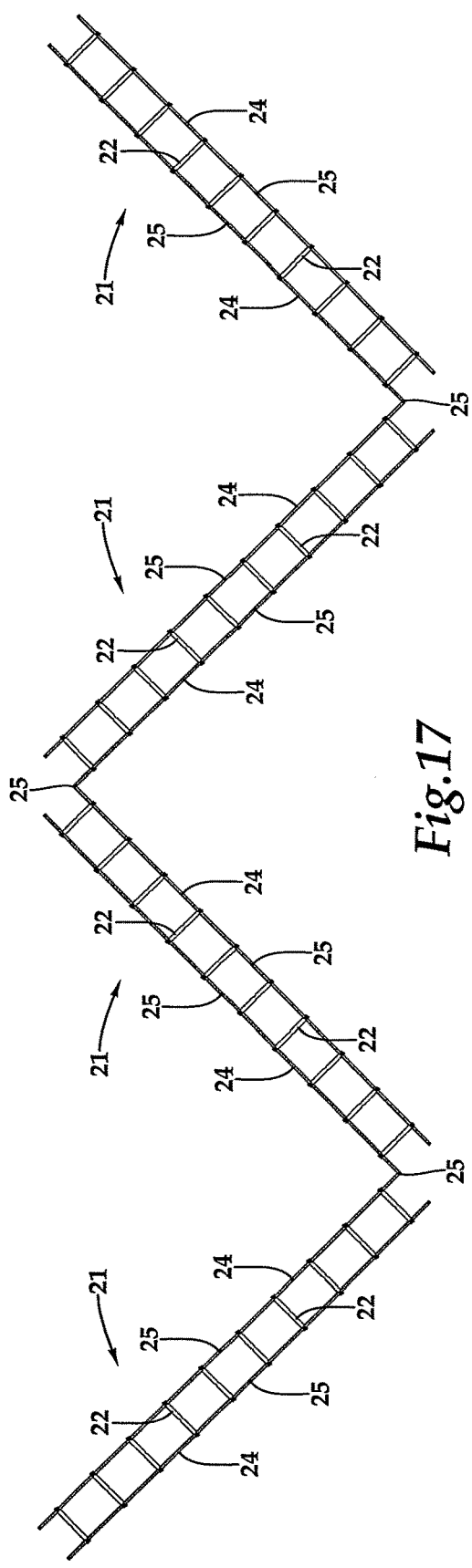
FIG. 17 is a plan view of a multiplicity of segments of the agility ladder of this invention connected into a ladder where placement of the ladder shifts the line advancement along the path defined by the agility ladder, into a zig zag pattern.

Agility ladders 21 can also be connected so the lane or path formed by partly overlapping ladders keeps shifting laterally as shown in FIG. 16 with just two or more rungs 22 connected by connectors 36 and 38. Another arrangement of the agility ladders 21 is to connect only one snap 25 on one of the straps 24 on each agility ladder so that successive agility ladders can be connected at right angles to form a zig zag course as shown in FIG. 17.

It should be understood that an agility ladder 21 may consist of one, two, or more segments 20. Further, the segment may have 5 rungs or 10 rungs or any convenient numbers of rungs. The strap 24 includes any elongated member of woven or twisted fiber which connects each of the plurality of rungs 22 so they are spaced apart to form an agility ladder 21.

It should be noted that the end connectors of the rungs permit more than two ladder segments to be connected sidewardly, so that a ladder of whatever multiple of rung length desired can be obtained.

It is understood that the invention is not limited to the particular construction and arrangement of parts herein illustrated and described, but embraces all such modified forms thereof as come within the scope of the following claims.

We claim:

1. An agility ladder exercise device comprising:
a first rung;
a second rung;
a first flexible strap which extends between and connects the first rung to the second rung;
a second flexible strap which extends between and connects the first rung to the second rung;
wherein each rung has a left connector and a right connector, the left connector having structure thereon which is configured to engage with a right connector of a rung of another agility ladder exercise device in a rigid connection, wherein each rung has portions defining a notch positioned between the left connector and the right connector, and further comprising a holder comprising:
a U-channel base having a top wall which connects a front wall to a rear wall, the front wall and the rear wall extending from an open left end to an open right end of the U-channel base, and wherein the front wall has a first segment spaced sidewardly from a second segment, and wherein a front restraint wall is spaced from the first front wall segment and the second front wall segment towards the rear wall, such that the agility ladder rungs may be received within the U-channel base such that the front restraint wall extends into the notches of the received rungs to thereby restrict escape of the rungs from the U-channel base in the direction of the left and right ends of the U-channel base.

2. The agility ladder exercise device of claim 1 wherein a first mechanical connector and a second mechanical connector extend from the front wall of the U-channel base, such that the holder is mechanically connectable to a like holder.

3. The agility ladder exercise device of claim 1, further comprising: a handle extending from the holder and connected to the rear wall of the U-channel base.

4. The agility ladder exercise device of claim 1, further comprising: a handle extending from the holder and connected to the top wall of the U-channel base.

5. The agility ladder exercise device of claim 1 further comprising a restraint strap connected to the holder and positioned to extend across an open bottom of the U-channel base, where the first and second rungs are inserted into the holder, and the restraint strap connected back to the holder, to thereby restrain escape of retained rungs of the agility ladder from between the front and rear walls.

6. An agility ladder exercise device comprising:
a first rung;
a second rung;
a first flexible strap which extends between and connects the first rung to the second rung;
a second flexible strap which extends between and connects the first rung to the second rung;
wherein each rung has a left connector and a right connector, the left connector having structure thereon which is configured to engage with a right connector of a rung of another agility ladder exercise device in a rigid connection, wherein the left connector comprises a T-slot which is spaced from a T-key, each of the T-slot and T-key having an underlying platform, and wherein the right connector has a corresponding T-slot and T-key structure arranged such that the T-key and T-slot of one rung can be engaged with and retained by the T-slot and T-key of a sidewardly adjoining rung.

7. An exercise device comprising:
a first agility ladder and a second agility ladder, wherein each comprises:
a plurality of rungs forming lineally extending members, each rung having a right side and a left side;
two spaced apart members of woven or twisted fiber which connect each of the plurality of rigid rungs spaced apart together to form a ladder; and
wherein each rung of the plurality of rungs has a left connector and a right connector, wherein when the first and second agility ladders are arrayed side by side the right connector of at least one of the plurality of rungs of the first ladder is connectable to the left connector of at least one of the plurality of rungs of the second ladder.

8. The exercise device of claim 7 wherein the left connector and the right connector form integral parts of each rung.

9. The exercise device of claim 8 wherein the left connector and the right connector are joined by rotation of the right connector relative to the left connector about an axis defined by a direction in which the rung lineally extending members extend, to form a rigid connection between at least one of the plurality of rungs of the first ladder and at least one of the plurality of rungs of the second ladder, which connection can only be separated by a counter rotation of the right connector and the left connector.

10. The exercise device of claim 9 wherein the right connector comprises a slot which is spaced from a key, and wherein the left connector has a corresponding slot and key structure arranged such that the key and the slot of at least one of the plurality of rungs of the first ladder can be engaged with and retained by the slot and the key of at least one of the plurality of rungs of the second ladder, and wherein at least one of the slot and key of each right and left connector, has an underlying platform such that when the key enters the slot, the key does not pass through the slot.

11. The exercise device of claim 10 wherein the slot is a T-slot and the key is a T-key.

12. The exercise device of claim 7 wherein each rung of the first agility ladder and the second agility ladder has two sides extending between the two spaced apart members of woven or twisted fiber and at least one of the two sides has portions defining a notch which extends toward the other of the two sides, the notch positioned between the left connector and the right connector, and further comprising a holder comprising:
a U-channel base having a top wall which connects a front wall to a rear wall, the front wall and the rear wall extending from an open left end to an open right end of the U-channel base, and wherein at least the front wall has a first segment spaced linearly from a second segment, and a front restraint wall between the first segment and the second segment arranged to extend into the notches in the rungs such that the rungs may be received within the U-channel base such that the front restraint wall extends into the notches of the received rungs to thereby restrict escape of the rungs from the U-channel base in the direction of the left and right ends of the U-channel base.

13. The exercise device of claim 12 wherein a first mechanical connector and a second mechanical connector extend from the front wall of the U-channel base, such that the holder is mechanically connectable to an identical holder.

14. The exercise device of claim 13 where the first mechanical connector and the second mechanical connector are rotated into engagement with the identical holder.

15. The exercise device of claim 14 wherein the first mechanical connector is a slot and the second mechanical connector is a key and portions of the key have a wall for which engages the slot which is curved with a radius about which the wall is rotated to bring the first mechanical connector and the second mechanical connector into engagement.

16. The exercise device of claim 14 wherein the first mechanical connector is a slot and the second mechanical connector is a T-key and the wall which engages the slot which is curved is one side of a leg forming the T.

17. An exercise device comprising:
a plurality of agility ladders each comprising:
a plurality of rungs forming lineally extending members, each rung having a right side and a left side;
two spaced apart members of woven or twisted fiber which connect each of the plurality of rigid rungs spaced apart a first distance;
wherein each of the two members of woven or twisted fiber has two terminal ends, which extend beyond the rungs by one half the first distance, to a part of a two part end connector;
wherein each rung of the plurality of rungs has a left side connector and a right side connector; and
wherein the right side connector of a rung of a first agility ladder of the plurality of agility ladders connects to the left side connector of a rung on another of the plurality of agility ladders, wherein the first and second agility ladders are arrayed side by side to form the exercise device.

18. The exercise device of claim 17 wherein the plurality of agility ladders form an obstacle course on a surface with a path which requires stepping between rungs, and wherein the path has lateral steps as well as linear steps.

19. The exercise device of claim 17 wherein the plurality of agility ladders form an obstacle course with a path which zig zags between the plurality of agility ladders, such that pairs of agility ladders are connected by the parts of the two part end connectors such that a single terminal end of each pair of agility ladders is connected.

* * * * *